(12) United States Patent
Barshinger et al.

(10) Patent No.: US 10,641,740 B2
(45) Date of Patent: May 5, 2020

(54) ULTRASOUND COUPLING MATERIAL AND METHOD OF USE

(71) Applicant: SENSOR NETWORKS, INC., Boalsburg, PA (US)

(72) Inventors: James Barshinger, State College, PA (US); Jeffrey Anderson, Lewistown, PA (US)

(73) Assignee: SENSOR NETWORKS, INC., Boalsburg, PA (US)

( * ) Notice: Subject to any disclaimer, the term of this patent is extended or adjusted under 35 U.S.C. 154(b) by 110 days.

(21) Appl. No.: 15/866,162

(22) Filed: Jan. 9, 2018

(65) Prior Publication Data

US 2018/0196011 A1    Jul. 12, 2018

Related U.S. Application Data

(60) Provisional application No. 62/444,076, filed on Jan. 9, 2017.

(51) Int. Cl.
| | |
|---|---|
| *G01N 29/24* | (2006.01) |
| *G01N 29/07* | (2006.01) |
| *G01B 17/02* | (2006.01) |
| *G01N 29/22* | (2006.01) |

(52) U.S. Cl.
CPC .......... *G01N 29/223* (2013.01); *G01B 17/02* (2013.01); *G01N 29/07* (2013.01); *G01N 29/2437* (2013.01); *G01N 2291/0258* (2013.01); *G01N 2291/02854* (2013.01); *G01N 2291/044* (2013.01); *G01N 2291/106* (2013.01); *G01N 2291/2634* (2013.01)

(58) Field of Classification Search
CPC ....... G01N 29/223; G01N 2291/02854; G01N 2291/2634; G01N 2291/0258; G01N 2291/044; G01N 2291/106; G01B 2210/58
USPC .......................................................... 73/592
See application file for complete search history.

(56) References Cited

U.S. PATENT DOCUMENTS

| | | | |
|---|---|---|---|
| 4,738,737 A | 4/1988 | Runde | |
| 4,929,368 A | 5/1990 | Baumoel | |
| 2009/0110845 A1 | 4/2009 | Lu | |
| 2009/0158851 A1* | 6/2009 | Song | B06B 1/0292 73/644 |
| 2014/0182382 A1* | 7/2014 | Kruger | G01N 29/228 73/632 |
| 2015/0128769 A1* | 5/2015 | Albrecht | B25B 13/50 81/99 |

* cited by examiner

*Primary Examiner* — Jacques M Saint Surin
(74) *Attorney, Agent, or Firm* — Fisherbroyles LLP

(57) ABSTRACT

A method of releasably adhering an ultrasonic sensor to a structure, the structure having an operating temperature range, the method comprising: applying a coupling agent between the structure and the sensor at an installation temperature, the coupling agent having a glass transition temperature (Tg) below the operating temperature range and below the installation temperature, the coupling agent being in a viscous/viscoelastic state over the operating temperature range; and urging the sensor against the structure with the coupling agent therebetween such that the sensor adheres to the structure.

13 Claims, No Drawings

ULTRASOUND COUPLING MATERIAL AND METHOD OF USE

REFERENCE TO RELATED APPLICATION

This application is based on U.S. Provisional Application No. 62/444,076, filed Jan. 9, 2017, and is hereby incorporated by reference.

FIELD OF INVENTION

This invention discloses an ultrasonic coupling material and method of use that is particularly useful for long-term ultrasonic monitoring of the condition and integrity of pipes and/or other structures or assets, such as those used in the oil and gas and power generation industries.

BACKGROUND

Wall thickness and the presence of defects such as cracks are important factors in determining the fitness-for-service of structures such as above and below ground pipes and tanks, including bulk material and weldments. When a pipe is in operation, it can be subject to corrosion and/or erosion due to the content, flow and/or environmental conditions inside or outside of the pipe. Cracks can form and propagate due to the presence of manufacturing defects, creep, thermal cycling, fatigue and environmental conditions causing defects such as high temperature hydrogen attack (HTHA), stress corrosion cracking, etc. Corrosion and/or erosion results in the reduction in wall thickness, which can reach a point at which operating conditions becomes unsafe, considering that the pipe can be pressurized and may contain hazardous or flammable materials. Likewise formation and propagation of cracks, in welds for instance, can cause similar unsafe conditions. A failure may cause catastrophic consequences such as loss of life and environmental damage in addition to the loss of the use of the asset, and any corresponding costs associated with repair, loss of capacity and revenue loss.

Ultrasonic non-destructive evaluation techniques are commonly used for evaluating the integrity of industrial components. In the case of measuring wall thickness reduction due to erosion/corrosion, the traditional process involves using a portable handheld instrument and ultrasonic transducer (probe) to measure the wall thickness. The instrument excites the probe via an electrical pulse, and the probe, in turn, generates an ultrasonic pulse which is transmitted through an ultrasonic coupling material and then the structure. The probe also receives an echo of the ultrasonic pulse from the structure and through the ultrasonic coupling layer, and converts the pulse back into an electrical signal. The ultrasonic pulses that are transmitted into and received from a structure are used to determine the relative position of the surfaces (i.e. thickness) of the structure wall. More specifically, by knowing the travel time of the ultrasonic pulse from the outer wall to the inner wall and back ($\Delta T$) and acoustic velocity (V) of the ultrasonic pulse through the material of the structure (through calibration or just initialization), a wall thickness (d) can be calculated—i.e. $d=\Delta T*V/2$. There are many variants other variants of ultrasonic thickness gauging and flaw detection that are known to skilled practitioners of ultrasonic nondestructive evaluation.

These approaches require an operator to manually position a probe on the wall of the asset to take a reading. Not only does this necessitate the operator manually taking each reading, but also the measurement location must be accessible, which can be challenging and costly. For example, buried pipelines require excavation to access, insulated pipe requires costly removal of the insulation, and offshore assets require helicopter or boat access, and elevated vessels requiring scaffolding or crane access. While the measurement is relatively simple, the cost of access (scaffolding, excavation, insulation removal, etc.) is often much higher than the cost of measurement. Moreover, the operator is often subjected to hazardous conditions while taking the readings. Furthermore, to obtain trending data with thickness resolution of 0.001" or better requires that the transducer be placed in the same exact location for consistent readings at regular time intervals. This is difficult and often impractical especially when the data-capture rate needs to be frequent. Variations in operator and/or equipment tend to skew the quality and integrity of the measurement data.

One approach for avoiding some of the aforementioned problems is to use installed sensors for asset-condition or -integrity measurement. The sensors are permanently or semi-permanently installed on the asset and can take advantage of features such as wireless data transmission to avoid costly wiring installations. Automated systems require no operator to be in the vicinity of the asset and can stream data to a control room or to an operator's desk. Current state of the art sensors have been shown to be useful and commercially successful for permanently monitoring structures using ultrasound.

A key challenge to implementing semi or permanently installed ultrasonic monitoring devices is the longevity of the acoustic coupling between the transducer and test piece. The ultrasonic coupling material is used to displace the air gap due to the imperfect mating of the transducer and test piece surfaces and further to provide a favorable ultrasonic propagation medium between the two in terms of loss, acoustic impedance, thickness, viscosity and so on. Traditionally, ultrasonic coupling materials comprise gel- or grease-like materials as seen in both medical and industrial ultrasonic applications. The requirements of these materials when subject to only temporary coupling are rather different than those required for permanent or semi-permanent use. When considering the harsh environments that the coupling agent may be subject to, for instance, high temperature, chemical exposure, moisture, radiation, etc., in addition to the rather long expected performance period of the coupling without maintenance (months to several years) the selection of such a material becomes quite challenging.

The problem of ultrasonic coupling has been investigated over the years as it relates to the problem of long term coupling of ultrasonic devices to structures of interest. Many solutions have been offered as optimum depending on the specific requirements of the test environment.

For example, US Patent application 20090110845 discloses the use of a thermoplastic film that is melted and used as an adhesive and coupling material. The thermoplastic material is used substantially below its melting point during operation and is only temporarily raised above its melting point in order to adhere the transducer and test specimen—essentially providing ultrasonic coupling while also adhering the transducer and test piece. While this method was shown to be effective, it has several drawbacks. First, the transducer and specimen must have their temperature raised substantially above their normal operating temperature in order to perform the adhesive joining. Second, the subsequent rigid bond is subject to stress and delamination over time of use. Third, the resulting bond does not allow moving or redeployment of the transducer if desired as the breaking of the adhesive bond will usually cause irreparable damage to the transducer.

Similarly, thermosetting materials such as epoxies have also been explored as options for installed ultrasonic sensors. While applying epoxies does not typically require the high processing temperature of a thermoplastic material as discussed above, the resulting rigid bond is still subject to failure due to loss of adhesion, particularly if strict surface coupling agent steps are not carried out. Additionally, the transducer is not movable and/or cannot be redeployed as the intentional breaking of the adhesion between transducer and test piece usually causes irreparable harm to the transducer.

U.S. Pat. No. 4,738,737 discloses a non-hardening grease composed of a heavy silicone fluid loaded with zinc oxide particles, such as is provided in Dow 340 heat sink compound. Applicants discovered this material after studying eighteen candidate materials for long term, high temperature ultrasonic coupling in nuclear reactor applications. While this heavy grease-like material shows promise for long term coupling, it can generally be moved by capillary forces during temperature cycling of the test piece. Generally, grease-like materials tend to separate, evaporate and/or outgas during operation that can limit the operational life of such materials. Along the same lines, U.S. Pat. No. 4,929,368 discloses a fluoroether grease acoustic couplant, such as DuPont Krytox grease, that is purported to be stable to 540 degrees Fahrenheit.

Other approaches involve the use of dry, metal to metal contact to achieve very high temperature capable (upwards of 900 degrees Fahrenheit) and long term stable ultrasonic coupling. These solutions tend to fulfil the need of high-temperature and long-term stability for installed sensor applications. Furthermore, the transducers are moveable. The downside of these approaches are the high coupling forces that are necessary to deform the transducer, test piece, and coupling foil and achieve basically a metal to metal seal in the acoustic path. To realize these solutions, substantial clamping apparatuses or welded-in-place brackets or studs are required. While this is certainly worth the effort for test pieces at extremely high operational temperatures, it is inconvenient and costly to implement.

Electromagnetic acoustic transducers have also been offered over the years as a solution for the ultrasonic coupling problem. EMATS directly excite the material surface via electromagnetic (Lorentz and/or Magnetostrictive) forces and therefore do not require coupling materials between transducer and test piece. While this solution is attractive for some applications, EMATS generally suffer from low sensitivity and ultrasonic resolution. The sensitivities may be 100 to 1000 times less sensitive than their piezoelectric counterparts.

It is recognized by Applicants that the ideal ultrasonic coupling agent is application dependent, and key factors include temperature range, reliability, long term stability and chemical compatibility. Accordingly, there is a need for an ultrasonic coupling for (semi) permanent application of ultrasonic transducers for the monitoring of assets such as those founding in the oil and gas industries with one or more of the following properties:

Provides the appropriate acoustic and mechanical properties to achieve ultrasonic coupling between an ultrasonic transducer and test piece.

Is chemically stable with minimum outgassing, noxious fumes and material degradation up to an elevated temperature in the range of 150 to 200 degrees centigrade.

Provides stable acoustic coupling at elevated and low temperatures and can withstand thermoscycling between the prescribed minimum and maximum operating temperatures.

Provides stable acoustic coupling for months or years as required by the maintenance intervals of the assets being tested.

Requires minimum or no special coupling agent of the transducer and test piece to achieve reliable results.

Has a low viscosity and/or can achieve thin coupling layers between transducer and test piece.

Is chemically compatible with the transducer and test piece materials.

Is removable, allowing repositioning of the transducer without harm to the transducer and/or test piece.

The applicants have discovered a coupling agent that fulfills one or more of these needs, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In accordance with the need for an ultrasonic coupling material for (semi) permanently installed ultrasonic transducers, Applicants have discovered that low Tg (glass transition temperature) polymer materials offer a good combination of favorable acoustic impedance match, chemical compatibility, reliability and long term stability. The Tg is chosen to be substantially below the operating temperature range such that the material is in a viscous/viscoelastic state over the range of operating temp. The material may be a pure polymer or modified with one or more fillers to alter the characteristics of the polymer such as viscosity, acoustic properties, temperature susceptibility and such. For example, an a polar, nonsetting thermopolymer having a glass transition temperature below −60° C., wherein the polymer has a surface tension of less than 40 mN/m above the glass transition temperature. The thermopolymer should not set, yet should have a high adhesion to metallic materials and transducer construction materials.

DETAILED DESCRIPTION

In one embodiment, the invention involves a method of releasably adhering an ultrasonic sensor to a structure, the structure having an operating temperature range. In one embodiment, the method comprising: applying a coupling agent between the structure and the sensor at an installation temperature, the coupling agent having a glass transition temperature (Tg) below the operating temperature range and below the installation temperature, the coupling agent being in a viscous/viscoelastic state over the operating temperature range; and urging the sensor against the structure with the coupling agent therebetween such that the sensor adheres to the structure.

An important aspect of the invention is that the coupling agent has a Tg below the operating temperature of the structure that is being measured. For example, in one embodiment, the operating range is 50 to 300° C., and more commonly 100 to 250° C., and even more commonly 150 to 200° C. In one embodiment, the Tg is substantially below said operating range. In one embodiment, the Tg is at least 30, 40 or 50° C. below the operating range. Accordingly, in one embodiment, the coupling agent has a glass transition temperature lower than 20, 0, −20, −40, −60, or −80° C., such that when used in the coupling agents according to the invention they have good deformability and remain soft within the temperature range in which the coupling agents are used because the polymers are in a rubber-like state. Generally, although not necessarily, it is preferred for the Tg to be below room temperature. This facilities installation, as the coupling agent is pliable at room temperature. Alternatively, the user may heat the coupling agent to raise its temperature about Tg during installation.

In one embodiment, the coupling agent has a melting point Tm above the operative range. In one embodiment, the Tm is at least 200, 225, 250, 275, 300, or 350° C.

In one embodiment, the polymer has a surface tension of less than 10, 20, 30, 40, 50 or 60 mN/m at 20° C. such that it has good adhesion between the material of the asset and the sensor.

Polymers suitable for use in the coupling agents according to the invention tend to comprise polar, non-setting fluid polymers. In one particular embodiment, the polymer comprises a polar, non-setting, fluid polymer which have a glass transition temperature lower than −60° C. and a surface tension of less than 40 mN/m at 20° C.

Such polymers are known in the prior art, and include, for example, polyalkanedienes, polyalkenes and polysiloxanes. Examples of suitable polyalkanedienes are polyisoprene, poly(1 butylene), poly(1-pentylene), poly(1-ethyl-1-butylene), poly (1-butyl-1-butylene) and poly(1-heptyl-1-butylene). An example of a suitable polyalkene is polyisobutene. Examples of suitable polysiloxane are poly(oxydimethylsilylene) (=polydimethylsiloxane) and poly(oxymethylphenylsilylene). Polyisobutene and poly(oxydimethylsilylene) are preferably used. In a particular embodiment, the coupling agent comprising one or more of the following commercially available materials: Stopaq CZ paste, Stopaq CZH paste, Stopaq CZHT paste, and Viscotaq Viscopaste The molecular weight of suitable polymers can vary over a wide range. The molecular weight of, for example, suitable polyalkenes can be, for example, 500 to 100,000. Suitable polyalkenes have a viscosity at 100° C. of approximately 10 to 50,000 cSt. The density of suitable polyakenes lies approximately between 0.75 and 1.10, preferably approximately between 0.85 and 0.95, the bromine number (gBr2/100 g) approximately between 0.1 and 50, the acid number (mg KOH/g) approximately between 0.01 and 0.05 and the specific electric resistance at 100° C. is preferably greater than 1012 Ωcm.

Suitable polysiloxanes (polyoxysilylenes) are, for example, those which at 25° C. have a density of approximately 0.75 to 1.10, preferably of 0.90 to 1.00, a surface tension of less than 35, preferably less than 25 mN/m, an acid number of approximately 0.01 mg KOH/g and a specific electric resistance according to the standard DIN 53482 of greater than 1012 Ωcm.

According to the present invention, polymers comprising polyisobutene and/or poly(oxydimenthylsilylene) which have a viscosity of between 60 000 and 1,200,000 cSt (60 to 1200 Pa·s) at 20° C. is advantageous.

The coupling agent according to the invention is able to withstand many chemical substances. For instance, the coupling agent is able to withstand water-containing solutions of inorganic and organic substances such as salts, acids and bases, for example solutions of hydrochloric acid, sulphuric acid, phosphoric acid, chlorosulphonic acid, potassium hydroxide, sodium hydroxide, potassium bichromate, acetic acid, organic solvents, for example benzene, and corrosive gases, such as ammonia.

The coupling agent according to the invention can also contain stabilizing agents, for example agents against oxidation under the influence of heat, such as 2,6-di-t-butyl-4methylphenol, and agents against the action of ultraviolet light.

The coupling agent according to the invention can contain one or more fillers. Said fillers can be of organic or inorganic nature. Examples of inorganic fillers are polyvinyl chloride, polyethene, polypropene, polyisoprene and rubber. Examples of inorganic fillers are inorganic minerals, salts and oxides, for example chalk, boron sulphate, aluminium oxide, silicon dioxide, ground quartz, glass, talc, slate, bentonite and the like. Preferably, a mixture of coarse and fine particles, in a specific mixing ratio, of one or more fillers is used.

The rheological characteristics of the coupling agent according to the invention can be controlled by means of the amount of filler. According to the invention, it is therefore preferable that the fillers comprise one or more fractions, The coupling agent according to the invention is deformable, even long after it has been applied. Because the coupling agent is and remains deformable and it has a paste-like to rubber-like appearance, it is therefore capable of absorbing vibration and shocks. Thus, in addition to the sealing effect, it also provides protection against mechanical effects.

To couple the coupling agent and sensor, a liberal amount of the couple agent is applied to either the bottom side of the sensor or the site on the asset to which the sensor will be placed. The amount applied should be sufficient such that a layer without voids forms between the sensor and the asset when the sensor is urged against the asset. Thus the volume should be sufficient to compensate for surface irregularities, curves, etc. It may be necessary to heat the coupling agent to decrease its viscosity during the application phase, thereby reducing the force necessary to urge the sensor against the asset.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A method of releasably adhering an ultrasonic sensor to a structure, said structure having an operating temperature range, said method comprising:

applying a coupling agent between said structure and said sensor at an installation temperature, said coupling agent having a glass transition temperature (Tg) below said operating temperature range and below said installation temperature, said coupling agent being in a viscous/viscoelastic state over said operating temperature range; and urging said sensor against said structure with said coupling agent therebetween such that said sensor adheres to said structure.

2. The method of claim 1, further comprising:
removing said sensor from said structure by pulling said sensor away from said structure at a temperature below said operating range at which said coupling agent has a surface tension no greater than 40 mN/m.

3. The method of claim 1, wherein said coupling agent has a surface tension of less than 40 mN/m above said Tg.

4. The method of claim 1, wherein said Tg is substantially below said operating range.

5. The method of claim 1, wherein said Tg is at least 50° C. below said operating range.

6. The method of claim 5, wherein said Tg is less than −20° C.

7. The method of claim 6, wherein said Tg is less than −60° C.

8. The method of claim 1, wherein said coupling agent has a melting temperature Tm, and said Tm is greater than said operating range.

9. The method of claim 1, wherein said coupling agent is a polymer.

10. The method of claim 9, wherein said polymer is selected from the group consisting of polyalkanedienes, polyalkenes and polysiloxanes.

11. The method of claim 10, wherein said polymer is selected from the group consisting of polyisoprene, poly(1 butylene), poly(1-pentylene), poly(1-ethyl-1-butylene), poly(1-butyl-1-butylene), poly(1-heptyl-1-butylene), polyisobutene, poly(oxydimethylsilylene)(=polydimethylsiloxane), and poly(oxymethylphenylsilylene).

12. The method of claim 11, wherein said polymer is selected from the group consisting of polyisobutene and poly(oxydimethylsilylene).

13. The method of claim 12, wherein said polymer is selected from the group consisting of Stopaq CZ™ paste, Stopaq CZH™ paste, Stopaq CZHT™ paste, and Viscotag™ viscopaste.

* * * * *